United States Patent [19]

Zaromb

[11] Patent Number: 4,499,734
[45] Date of Patent: Feb. 19, 1985

[54] POWER GENERATION APPARATUS AND METHODS

[76] Inventor: Solomon Zaromb, 9 S. 706 William Dr., Hinsdale, Ill. 60521

[21] Appl. No.: 415,186

[22] Filed: Sep. 7, 1982

Related U.S. Application Data

[60] Division of Ser. No. 179,274, Aug. 18, 1980, Pat. No. 4,416,954, which is a continuation-in-part of Ser. No. 704,452, Jul. 12, 1976, Pat. No. 4,305,999, Ser. No. 20,967, Mar. 16, 1979, Pat. No. 4,218,520, and Ser. No. 080,185, Oct. 1, 1979, Pat. No. 4,254,190.

[51] Int. Cl.³ .............................................. H01M 8/06
[52] U.S. Cl. ...................................... 60/673; 60/721; 429/50
[58] Field of Search ...................... 429/13, 15, 17, 19, 429/27, 29, 34, 35, 50; 60/649, 673, 721

[56] References Cited

U.S. PATENT DOCUMENTS

| | | | |
|---|---|---|---|
| 3,981,747 | 9/1976 | Doniat et al. | 429/15 |
| 4,150,197 | 4/1979 | Zaromb | 429/15 |
| 4,218,520 | 8/1980 | Zaromb | 429/27 |

*Primary Examiner*—Allen M. Ostrager

[57] ABSTRACT

Methods and apparatus for the generation of energy from the oxidation of aluminum comprise means for breaking up the continuity of the passivating oxide layer on the aluminum surface by exposing said surface to a mercury-, indium- or gallium-containing substance, exposing the surface-treated aluminum to a fluid which is capable of oxidizing said aluminum, and withdrawing useful energy from the oxidation reaction. The oxidizing fluid may be air, with the energy-withdrawing means a thermal engine, preferably of the closed cycle type. Alternatively, the fluid may be an aqueous electrolyte, preferably a neutral saline, mildly alkaline or mildly acidic solution, with the energy-withdrawing means comprising an electrochemical cell.

11 Claims, 7 Drawing Figures

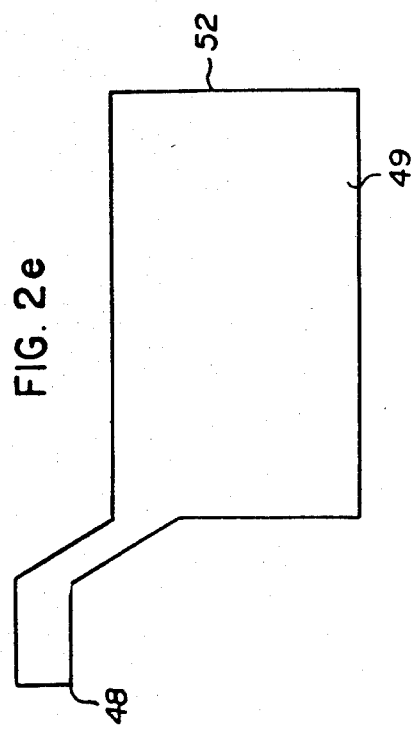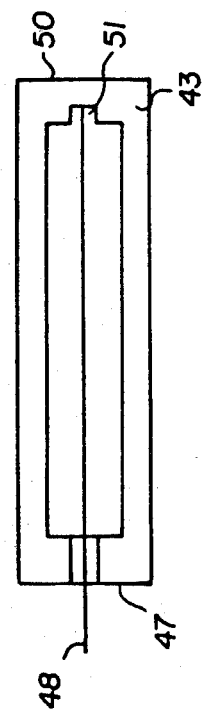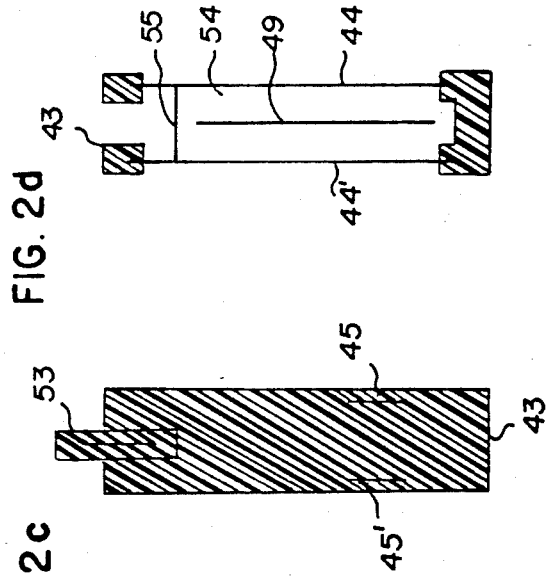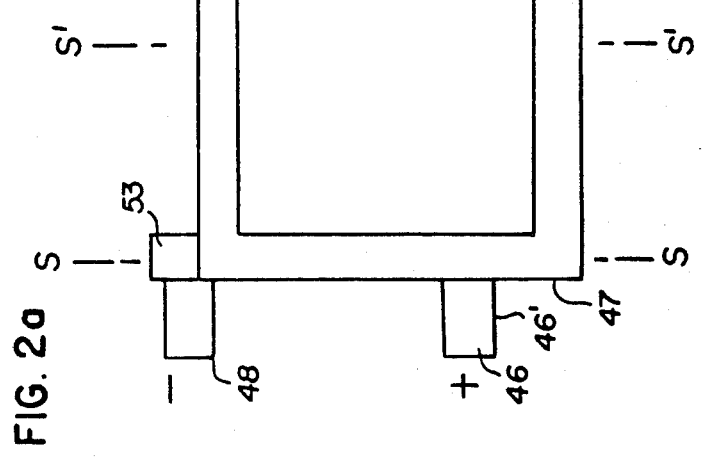

POWER GENERATION APPARATUS AND METHODS

This is a divisional application of my application Ser. No. 179,274, filed Aug. 18, 1980, now U.S. Pat. No. 4,416,954, which is a continuation-in-part of my applications Ser. No. 704,452, filed July 12, 1976, now U.S. Pat. No. 4,305,999, Ser. No. 20,967, filed Mar. 16, 1979, now U.S. Pat. No. 4,218,520, and Ser. No. 080,185, filed Oct. 1, 1979, now Pat. No. 4,254,190.

BACKGROUND OF THE INVENTION

This invention relates to methods and apparatus for generating electrical, thermal or mechanical energy from the oxidation of aluminum or its alloys, especially from aluminum waste and other inexpensive aluminum products.

In my copending applications and prior patents, I have disclosed apparatus and methods for withdrawing electrical energy, heat, and an aluminum hydroxide reaction product from the electrochemical oxidation of aluminum, preferably in aqueous alkaline electrolytes. The present invention deals with apparatus and methods for generating mechanical or electrical energy from the oxidation of aluminum without necessarily resorting to aqueous alkaline systems or even to electrochemical energy conversion.

Electrochemical power sources usually necessitate a number of series-connected cells to provide the required voltage. Moreover, the electrochemical aluminum-consuming systems disclosed thus far usually necessitate electrolyte circulation through these cells, which in turn introduces current leakage problems. The complexity of such series-connected systems increases their cost and may affect their reliability.

It is therefore an object of my invention to provide aluminum-consuming power sources which are simpler in design and operation, and cheaper to manufacture and maintain.

Closed-cycle thermal energy conversion systems have been developed and perfected during the last century, and especially during the last few decades to the point of providing energy conversion efficiencies of up to about 40% and of being fairly compact and relatively simple in design. With the enthalpy of oxidation of aluminum being equivalent to nearly 3 electron-volts, a thermal aluminum-consuming engine operating at an efficiency of between 30% and 40% becomes equivalent to an electrochemical power system yielding between 0.9 volt and 1.2 volt/cell at 100% faradaic efficiency.

It is therefore a further object of my invention to provide a thermal engine deriving its heat from the enthalpy of oxidation of aluminum.

Beside being simpler and more compact than electrochemical power systems, thermal engines are also capable of operating at higher peak power densities. In addition, the aluminum hydroxide reaction product in electrochemical systems has a high water content and is rather voluminous to start with, and said water content can only be reduced through special processing, requiring auxiliarys equipment, whereas the aluminum oxide reaction product of a thermal engine must be dry to start with due to the elevated combustion temperature required for a high energy conversion efficiency.

It is therefore still another object of my invention to provide an aluminum-consuming power source having high overall energy storage and power densities.

In alternative embodiments of my invention, the energy conversion means is still electrochemical rather than thermal. However, it differs from previously disclosed aluminum-consuming electrochemical cells in using a non-caustic or only mildly caustic electrolyte.

Non-alkaline primary aluminum batteries are known in the art. However, such batteries have utilized aluminum alloys of special composition.

It is yet another object of my invention to provide non-alkaline aluminum consuming electrochemical cells which do not necessitate the use of special alloys It is still another object of my invention to provide aluminum-consuming power sources which can utilize disposable aluminum cans or other inexpensive forms of aluminum as their primary fuel.

SUMMARY OF THE INVENTION

Briefly; my invention consists of breaking up the continuity of the protective oxide film, which normally forms on the surface of aluminum alloys, so as to permit air-oxidation of aluminum in a thermal engine or electrochemical oxidation in a mild aqueous electrolyte. Such break-up may be effected by immersion of the aluminum in a solution containing a compound of mercury, indium or gallium, preferably the latter. These elements then to remain at the aluminum surface, and continue to break up the continuity of the protective oxide film even after withdrawal from said solution, thereby facilitating oxidation of the aluminum. Thanks to its extremely low vapor pressure even at elevated temperatures, gallium tends to persist at the surface and thereby promote oxidation even at temperatures approaching the melting point of aluminum. The gallium-treated aluminum is therefore usable in lieu of carbonaceous fuels as a source of heat in a thermal engine. Alternatively, aluminum-consuming electrochemical cells can be made to yield satisfactory current densities and cell voltages when used with a non-caustic or mildly caustic electrolyte comprising a compound mercury, indium or gallium.

BRIEF DESCRIPTION OF THE DRAWINGS

My invention may be best understood with the aid of the drawings, in which:

FIG. 2a is a diagrammatic front view of one or more battery cells according to an alternative embodiment of my invention;

FIG. 2b is a diagrammatic top view of a single battery cell of FIG. 2a;

FIGS. 2c and 2d are diagrammatic views of sections S-S and S'—S', respectively, of a single cell of FIG. 2a;

FIG. 2e is the pattern of the aluminum anode 49 of FIGS. 2b and 2d;

and

Figure 3:
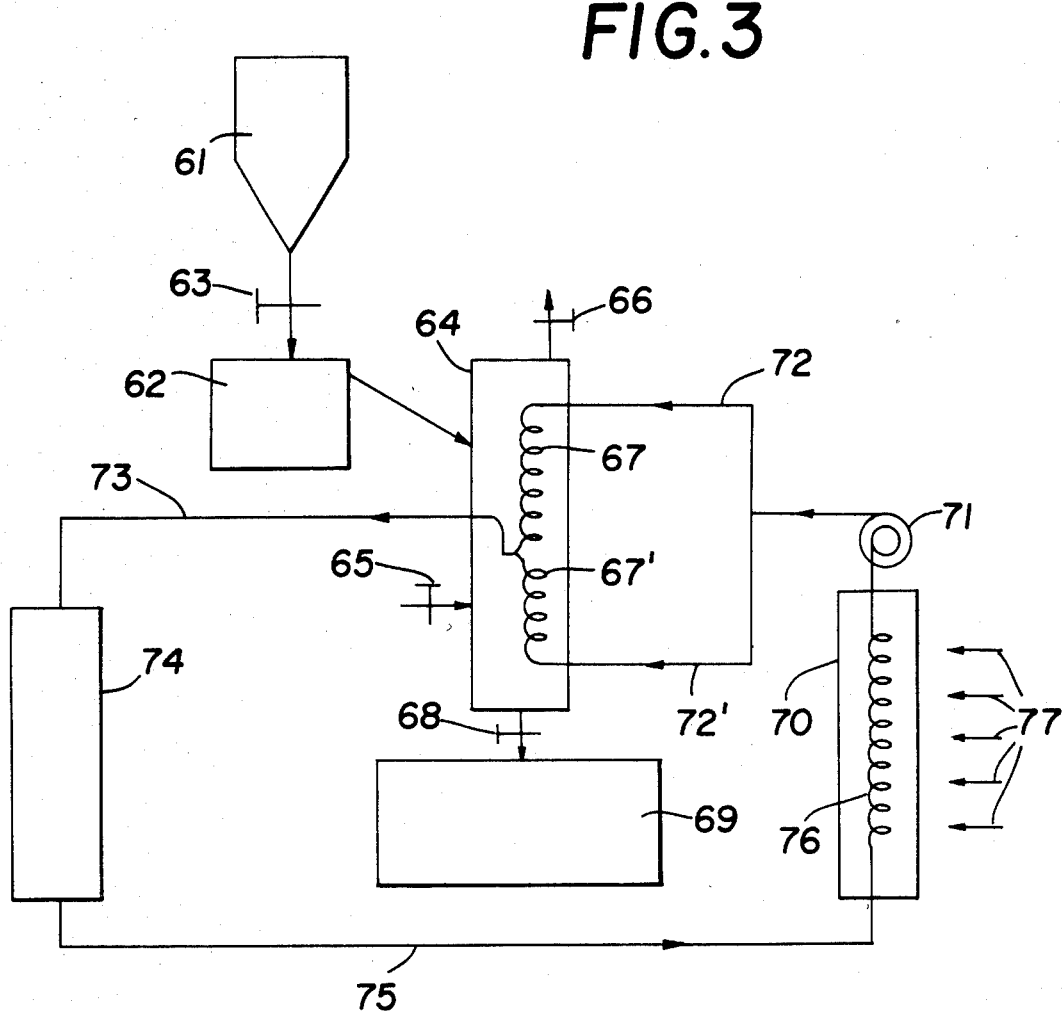

FIG. 3 is a block diagram of another preferred embodiment of my invention.

DESCRIPTION OF THE PREFERRED EMBODIMENTS

Figure 1:
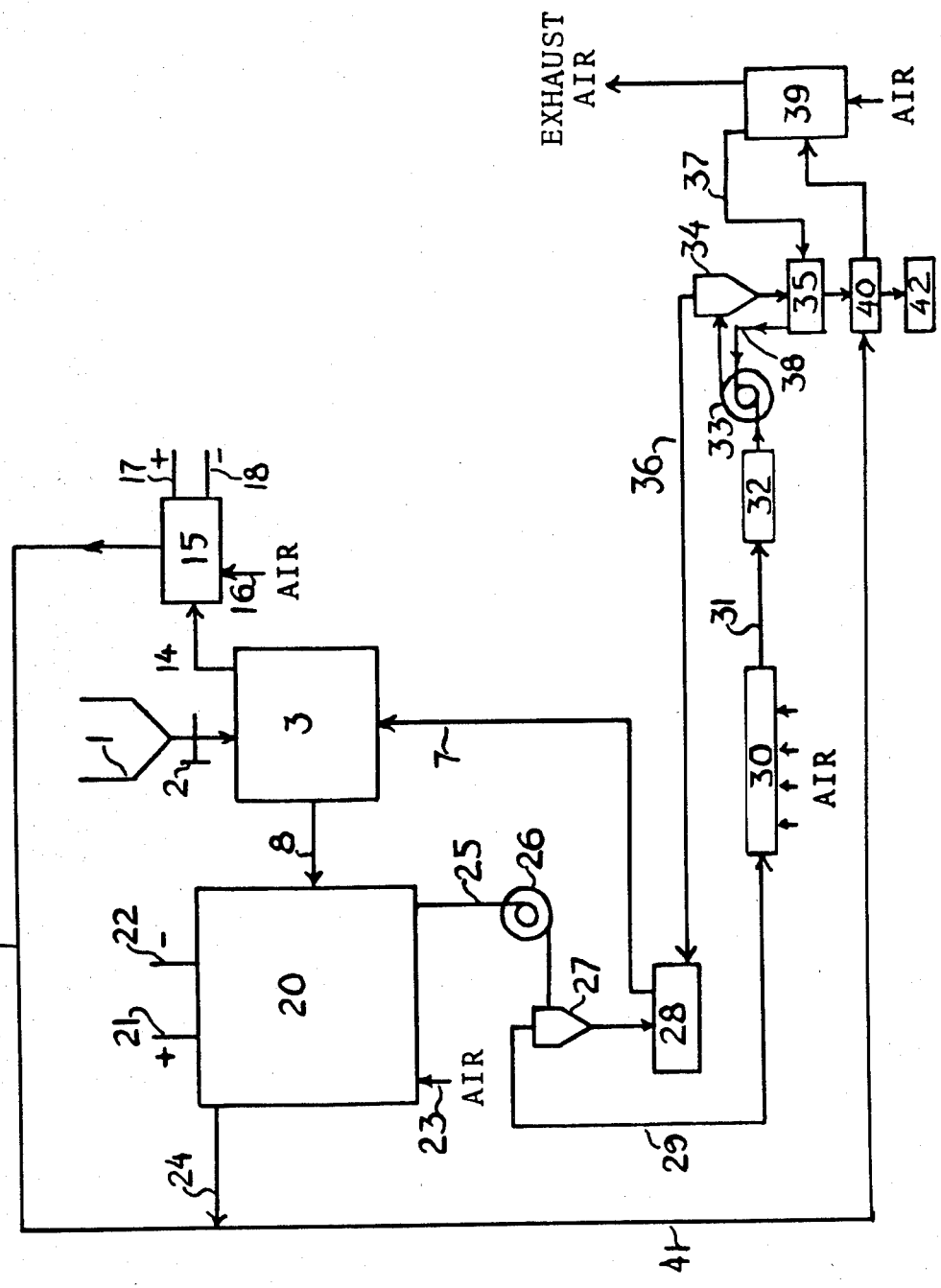
FIG. 1 is a block diagram of one preferred embodiment of my invention.

In the embodiment represented by the block diagram of FIG. 1, aluminum particles are fed upon demand from a hopper 1 by means of an electrically or manually actuated control valve mechanism 2 into a slurry-mixing chamber 3. The valve mechanism 2 may be similar to one of those discussed in my copending application Ser. No. 080,185, filed Oct. 1,1979. Chamber 3 is connected to an inlet tube 7, an outlet tube 8, and a short upper tube 11 connected to the valve mechanism 2.

The slurry entering chamber 3 through inlet 7 is preferably at a temperature of about 60° C., and is depleted of aluminum particles. However, after mixing with the particles added through valve 2, the slurry exiting through tube 8 is aluminum-enriched. This slurry is fed through tube 8 into an aluminum/air battery stack, which is similar in overall structure to the slurry-type zinc-air battery described in the technological literature, especially in a publication by A. J. Appleby et al. in the Proceedings of the 1975 Intersociety Energy Conversion Engineering Conference, pages 811–816, which is included herein by reference. However, thanks to the far lower specific gravity of aluminum particles (2.7 g/cc which is less than half of that of zinc particles) it becomes permissible to use here a less viscous, and hence more conductive, electrolyte. This, in turn, results in smaller ohmic losses, and hence in higher cell voltages at comparable current densities or in higher current densities at comparable voltages than was possible in the cited zinc/air battery.

The total exposed area of the aluminum particles immersed within the slurry should perferably be barely sufficient to yield the desired power output from the battery stack 20, but should not appreciably exceed this requirement so as to avoid loss of energy conversion efficiency through hydrogen generation. To minimize such losses, any hydrogen generated by reaction of water with the aluminum particles may be collected in chamber 3 in the space above the electrolyte level and fed through a tube 14 to a small auxiliary hydrogen/air fuel cell 15, comprising also an air inlet 16, positive and negative terminals 17 and 18, respectively, connected to the respective cathode and anode current-collector grids (not shown), and a warm air outlet 19.

The electric current from battery 20 is withdrawn via the positive and negative terminals 21 and 22 (connected to the respective anode and cathode current-collecting grids, not shown). Fresh air is supplied to the battery via inlet 23, and the partly oxygen-depleted air leaves through outlet 24. The partly aluminum-depleted slurry leaving battery 20 through outlet 25, preferably at a temperature of 70° C. to 90° C., is fed by pump 26 into a cyclone separator 27, wherefrom the aluminum particles are expelled into chamber 28, while the clear supernatant fluid exits through line 29 into an air-cooled heat-exchanger 30. The liquid exiting from heat exchanger 30 via outlet line 31 should be preferably at 60° C. or cooler. At this temperature, the excess aluminum ions will precipitate out of the electrolyte when exposed to aluminum hydroxide seeds in the precipitator 32. The aluminum hydroxide slurry from precipitator 32 is forced by pump 33 through a cyclone separator 34, wherefrom the aluminum hydroxide is expelled into chamber 35, while the supernatant liquid is returned via line 36, chamber 28, and line 7 into the mixing chamber 3. When passing through chamber 28, the liquid from cyclone 34 entrains the aluminum particles and returns them to chamber 3, thereby completing one entire cycle.

The aluminum hydroxide expelled from cyclone 34 contains some adsorbed ions from the electrolyte. To minimize such electrolyte losses, the precipitate in chamber 35 may be rinsed with distilled water from line 37, and the rinsings may be recirculated via line 38 and pump 33 into cyclone 34. The distilled water in line 37 originates from the condenser 39, wherein humid and warm air leaving the aluminum hydroxide dryer 40 is cooled with ambient air, thereby being caused to give up its excess moisture.

Both the aluminum/air battery 20 and the hydrogen/air fuel cell 15 operate preferably at a temperature of 70°–90° C. The air fed to the cathodes of each of these power sources is allowed to approach a temperature of about 70° C., and is thereafter fed through lines 19, 24, and 41 into the aluminum hydroxide dryer 40 wherein it is blown through the previously rinsed aluminum hydroxide from chamber 35. Dryer 40 may comprise a plurality of porous polytetrafluoroethylene membranes (not shown) through which the air from line 41 may freely pass, but which prevent the entrainment of solid particles. The dried aluminum hydroxide may then be transferred into an aluminum hydroxide storage bag 42.

Of course, the aluminum hydroxide rinsing and drying operations, as well as the transfers of aluminum hydroxide from chamber 35 to dryer 40 and then to storage bag 42, may be preferably effected in discontinuous steps.

While the foregoing block diagram looks outwardly identical with that of FIG. 1 of my copending application Ser. No. 080,185, filed Oct. 1, 1979, there are several major differences between the two systems. In first place, the present embodiment does not resort to an intermediary zinc/zincate couple in the battery stack 20. Secondly, the electrolyte used herein is not alkaline. A saline, mildly alkaline, or mildly acidic electrolyte may be adequate provided that it comprise a dissolved compound of mercury, indium, or, preferably, gallium in a concentration sufficient to activate the aluminum surface by breaking up the continuity of the passivating aluminum oxide film. A concentration of the order of 1 gram/liter of $Ga^{+3}$ ions may usually suffice for this purpose. Thirdly, the use of a non-alkaline electrolyte permits a higher operating battery temperature without entailing excessive corrosion, which in turn improves the air cathode performance and reduces the size and weight of the required heat-exchangers.

For some applications it may be advantageous to add a phosphate buffer to the electrolyte. Such a buffer may improve the characteristics of the anode by tying up undesirable iron ions, and it may also improve the performance of the air cathode. The latter may also be improved by an intermediary oxidation-reduction couple such as $I^-/I_2$ or $I^-/I_3^-$.

The same type of electrolyte may also be used in the alternative embodiment of FIGS. 2a though 2e. FIG. 2a is a front view of one or more cells of a reserve type aluminum/air battery for marine applications. Each cell comprises an outer rectangular casing 43 made of an insulating material, preferably a molded plastic, into which are sealed two air cathodes 44, 44', each made of Teflon-bonded activated carbon particles (by methods well known to persons skilled in the art) and comprising current-collecting metal screens 45, 45' connected to the positive cell terminals 46, 46'. As indicated in FIGS. 2b, 2c, and 2e, the upper part of the short left side 47 of casing 43 is slotted so as to accomodate the tab 48 of an aluminum anode sheet or plate 49. The opposite short side 50 of casing 43 may comprise a groove 51 designed to accomodate the right edge 52 of anode 49. Before inserting said anode inside casing 43, the tab 48 is first covered on both sides by a gasket 53 (which may be made of two similar strips of rubber, or other suitable resilient material, bonded together along their lower edges) and is then forced into the slotted edge 47 of casing 43, with edge 52 of the anode sliding into and being held in place by groove 51 of edge 50. The electrolyte may then be introduced into chamber 54 (FIG. 2d) up to a level 55 which is sufficient to completely submerge the rectangular portion of anode 49 while remaining slightly below the lower external edges of gasket 53.

The main purpose of gasket 53 is to prevent access of electrolyte and air to those portions of anode 49 which are not submerged. The electrolyte breaks up the continuity of the protective oxide film on the aluminum surface thereby permitting electrochemical cell action. However, this would also permit rapid air oxidation of the tab 48 near the the air-electrolyte interface in the absence of gasket 53. The latter eliminates the triple aluminum-air-electrolyte interface, thereby preserving the integrity of the protective oxide film in that part of the anode 49 which is not submerged.

Alternatively, a triple aluminum-electrolyte-air interface may be prevented by covering up the non-submerged part of anode 49 by a suitable coating or sealant, such as a silicone or epoxy resin.

In the alternative embodiment represented by the block diagram of FIG. 8, aluminum particles from a hopper 61 are allowed to drop into an immersion chamber 62 by opening an electrically or manually actuated control valve 63. Chamber 62 contains an aqueous solution of a gallium compound, such as $GaCl_3$. The immersed particles are then scooped up by a net (not shown) and rapidly transferred therewith into a reaction chamber 64 comprising an air inlet valve 65, an air outlet valve 66, a dual heat-exchanger 67, 67', and an aluminum oxide outlet valve 68. The gallium formed at the aluminum surface breaks up the integrity of the protective oxide coating, thereby permitting air-oxidation of the aluminum particles. The heat generated by this reaction is withdrawn by the heat exchanger portions 67 and 67'. Valves 65 and 66 are adjusted to control the air circulation through chamber 64 so as to assure thorough oxidation of the aluminum particles while minimizing heat losses in the outgoing air. The latter is cooled by the countercurrent upper heat-exchanger portion 67. Similarly, the heat content of the aluminum oxide reaction product discharged through valve 68 into a collection bag 69 is minimized by cooling at the lower countercurrent heat-exchanger portion 67'. Bag 69 may be expansible and replaceable when full by an empty bag.

The fluid circulating through heat-exchanger 67, 67' may be $H_2O$, Hg, diphenylethane, or any other fluid suitable for Rankine cycle or other closed cycle thermal engine. This fluid is pumped in liquid form from a condenser 70 through a pump 71 into the inlet lines 72, 72' of the heat-exchanger portions 67, 67'. As the fluid absorbs heat from the aluminum oxidation reaction, it vaporizes, and the hot vapor finally exits under pressure via a common outlet line 73, whence it is fed into the thermal engine 74. The latter may be of a piston or turbine type, either of which are well known to persons skilled in the art.

As the vapor passes through engine 74, it expands against a piston or turbine, thereby performing mechanical work. The vapor exits from engine 74 at reduced pressure and temperature, and is fed via line 75 into a condenser 70, comprising a heat-exchanger 76 cooled by an ambient air stream 77. There the vapor condenses into a liquid, which is recirculated by pump 71 so as to repeat the cycle.

The system of FIG. 3 can thus be seen to resemble a coal-or wood-fired heat engine. However, the primary fuel consists here of surface-pretreated aluminum particles, with the exhaust gases being substantially free of pollutants, as the reaction between air and aluminum yields solely aluminum oxide and oxygen-depleted air. Aluminum particles of various shapes and sizes may be usable for this process. However, for best performance and efficiency, it is usually preferable to use particles of smaller size, so that only a relatively small amount of aluminum should have to be present in reaction chamber 4 to provide the required rate of heat evolution.

While a variety of aluminum alloys may be adaptable to this process, the least expensive ones, e.g., recycled aluminum cans, should be preferable from the economic viewpoint. However, care must be taken to have the surfaces of these aloys free of lacquers or other coatings to assure proper surface-pretreatment in immersion chamber 62. For instance, the lacquers which are ordinarily applied to commercial aluminum cans should be removed by immersion in sulfuric acid for about a minute or in methylethylketone for a longer time, or by other effective means, such as sandblasting.

There will now be obvious to persons skilled in the art many modifications and variations of the above-disclosed embodiments which, however, wil remain within the scope of my invention if defined by the following claims.

I claim:

1. Apparatus for the generation of energy from the oxidation of aluminum or its alloys which comprises:
    (a) means for breaking up the continuity of the passivating oxide layer on the aluminum surface by exposing said surface to a mercury-, indium-, or gallium-containing substance;
    (b) a reaction chamber wherein the surface-treated aluminum is exposed to a gaseous fluid engaging in an oxidation reaction therewith; and
    (c) means for withdrawing useful energy from said oxidation reaction, wherein said energy withdrawing means is a thermal engine.

2. Apparatus of claim 1, wherein said oxidizing fluid is air, and wherein said substance is a solution of a gallium compound.

3. A method of generating energy from the oxidation of aluminum or its alloys which comprises:
    (a) breaking up the continuity of the passivating oxide layer on the aluminum surface by exposing said surface to a mercury-, indium- or gallium-containing substance;
    (b) exposing the surface-treated aluminum to a gaseous fluid engaging in an oxidation reaction therewith; and
    (c) withdrawing useful energy from said oxidation reaction.

4. The method of claim 3 wherein said oxidizing fluid is air, and wherein said useful energy is withdrawn by converting the heat generated in said oxidation reaction into mechanical energy via a thermal engine cycle.

5. The method of claim 4 wherein said cycle is a closed-loop thermal cycle.

6. A method of generating energy from the oxidation of aluminum or its alloys which comprises:
    (a) breaking up the continuity of the passivating oxide layer on the aluminum surface by exposing said surface to a mercury-, indium- or gallium-containing substance;

(b) exposing the surface-treated aluminum to a fluid engaging in an oxidation reaction therewith; and (c) withdrawing useful energy from said oxidation reaction; (The method of claim 14) wherein said (electrolyte is) fluid is an aqueous neutral saline, mildly alkaline or mildly acidic electrolyte, and said useful energy is withdrawn via an electrochemical cell action upon a solid or slurry-type anode.

7. The method of claim 6 which comprises feeding aluminum or aluminum alloy particles into an electrolyte solution upon demand, circulating the particle-electrolyte mixture in form of a slurry through one or more electrochemical cells, and withdrawing the current generated from the electrochemical oxidation of said particles through one or more anode collector grids.

8. The method of claim 6 which comprises causing an aluminum anode to be submerged in said electrolyte within an electrochemical cell compartment and preventing the formation of a triple aluminum-electrolyte-air interface by covering up the non-submerged anode portions near said electrolyte with a gasket, coating or sealant.

9. The method of claim 6 wherein said electrolyte comprises phosphate ions.

10. The method of claim 6 wherein said electrochemical cell comprises an air-depolarized cathode, and wherein said electrolyte comprises an intermediary air-oxidizable oxidation-reduction couple for improving the cathode performance.

11. The method of claim 10, wherein said electrolyte comprises an $I^-/I_2$ or $I^-/I_3^-$ oxidation-reduction couple.

* * * * *